(12) United States Patent
Le et al.

(10) Patent No.: US 10,150,446 B2
(45) Date of Patent: Dec. 11, 2018

(54) BELT ASSEMBLY INCLUDING PAYOUT MEASUREMENT

(71) Applicant: Ford Global Technologies, LLC, Dearborn, MI (US)

(72) Inventors: Jialiang Le, Canton, MI (US); Manoharprasad K. Rao, Novi, MI (US); Srinivasan Sundararajan, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 204 days.

(21) Appl. No.: 15/095,355

(22) Filed: Apr. 11, 2016

(65) Prior Publication Data

US 2017/0291575 A1    Oct. 12, 2017

(51) Int. Cl.
| | |
|---|---|
| *B60R 22/46* | (2006.01) |
| *B60R 22/48* | (2006.01) |
| *G01B 7/02* | (2006.01) |
| *G01B 11/02* | (2006.01) |
| *B60R 22/12* | (2006.01) |
| *B60R 21/015* | (2006.01) |

(52) U.S. Cl.
CPC ........ *B60R 22/48* (2013.01); *B60R 21/01548* (2014.10); *B60R 22/12* (2013.01); *G01B 7/026* (2013.01); *G01B 11/02* (2013.01); *B60R 2022/485* (2013.01); *B60R 2022/4825* (2013.01)

(58) Field of Classification Search
CPC .............................. B60R 22/48; B60R 22/12
USPC ...... 180/268, 72, 272; 280/735, 806; 701/45
See application file for complete search history.

(56) References Cited

U.S. PATENT DOCUMENTS

| | | |
|---|---|---|
| 4,103,842 A | 8/1978 | Martin et al. |
| 4,346,778 A | 8/1982 | Bluggel et al. |
| 4,747,215 A | 5/1988 | Waikas |
| 5,141,249 A | 8/1992 | Saitoh et al. |
| 5,413,378 A | 5/1995 | Steffens, Jr. et al. |
| 5,433,014 A | 7/1995 | Falk et al. |
| 5,454,591 A | 10/1995 | Mazur et al. |

(Continued)

FOREIGN PATENT DOCUMENTS

| | | |
|---|---|---|
| CN | 103010152 A | 4/2013 |
| CN | 105083209 A | 11/2015 |

(Continued)

OTHER PUBLICATIONS

Non-Final Office Action dated Apr. 21, 2017 in related co-pending U.S. Appl. No. 15/274,459.

(Continued)

*Primary Examiner* — Toan C To
(74) *Attorney, Agent, or Firm* — Frank A. MacKenzie; Bejin Bieneman PLC (57) ABSTRACT

A belt assembly includes a belt retractor, a sensor having a detection field, and a belt retractably payable from the belt retractor through the detection field. The belt has a webbing and a plurality of markers fixed to the webbing. The webbing has a longitudinal length and the markers are equally spaced along the longitudinal length of the webbing. The sensor senses the length of the webbing paid out. A size of the occupant may be determined based on the length of the webbing paid out, and the size of the occupant may be used to classify the occupant in classes.

15 Claims, 8 Drawing Sheets

(56) References Cited

U.S. PATENT DOCUMENTS

| | | | |
|---|---|---|---|
| 5,653,504 A | 8/1997 | Henson | |
| 5,709,408 A | 1/1998 | Carraway, Jr. | |
| 5,906,393 A | 5/1999 | Mazur et al. | |
| 6,203,059 B1* | 3/2001 | Mazur | B60R 22/48 280/735 |
| 6,439,333 B2* | 8/2002 | Domens | B60R 21/33 180/268 |
| 6,448,907 B1* | 9/2002 | Naclerio | B64D 25/06 244/122 R |
| 6,581,960 B1 | 6/2003 | Schondorf et al. | |
| 6,616,186 B1* | 9/2003 | Midorikawa | B60R 21/01 280/735 |
| 6,869,105 B2 | 3/2005 | Cheng | |
| 7,163,075 B2 | 1/2007 | Gray | |
| 7,306,261 B2 | 12/2007 | Nomura | |
| 7,419,026 B2 | 9/2008 | Midorikawa | |
| 7,576,642 B2 | 8/2009 | Rodemer | |
| 7,735,766 B2 | 6/2010 | Nomura | |
| 8,095,274 B2 | 1/2012 | Burkhardtsmaier | |
| 8,195,365 B2 | 6/2012 | Bemhagen et al. | |
| 8,302,995 B2 | 11/2012 | Xu et al. | |
| 8,303,043 B2 | 11/2012 | Humbert | |
| 8,952,801 B2 | 2/2015 | Larice | |
| 9,434,349 B1 | 9/2016 | Perkins et al. | |
| 2002/0063009 A1 | 5/2002 | Oyaski | |
| 2004/0036270 A1 | 2/2004 | Roychoudhury et al. | |
| 2004/0135360 A1 | 7/2004 | Stanley | |
| 2004/0160339 A1 | 8/2004 | Yamanoi et al. | |
| 2005/0206152 A1 | 9/2005 | Delventhal et al. | |
| 2006/0095184 A1 | 5/2006 | Gray et al. | |
| 2006/0119091 A1 | 6/2006 | Takao et al. | |
| 2007/0216214 A1 | 9/2007 | Delventhal et al. | |
| 2008/0094195 A1* | 4/2008 | Odate | G06K 9/00362 340/438 |
| 2009/0112408 A1 | 4/2009 | kankanala et al. | |
| 2009/0267339 A1 | 10/2009 | Usoro et al. | |
| 2009/0303065 A1 | 12/2009 | Lipowski | |
| 2010/0114436 A1 | 5/2010 | Bemhagen et al. | |
| 2013/0073148 A1 | 3/2013 | Dolan et al. | |
| 2013/0328296 A1 | 12/2013 | Burkhardtsmaier et al. | |
| 2015/0265200 A1* | 9/2015 | Mahdi | A61B 5/0205 600/301 |
| 2015/0360643 A1 | 12/2015 | Cech et al. | |
| 2016/0059818 A1 | 3/2016 | Witt et al. | |
| 2016/0159320 A1 | 6/2016 | Andreen | |
| 2016/0347278 A1 | 12/2016 | Bibbs, Jr. | |
| 2017/0028965 A1 | 2/2017 | Ohno et al. | |
| 2017/0144625 A1 | 5/2017 | Le et al. | |
| 2017/0291576 A1* | 10/2017 | Le | B60R 22/48 |

FOREIGN PATENT DOCUMENTS

| | | |
|---|---|---|
| CN | 204937070 U | 1/2016 |
| DE | 19909001272 U1 | 4/1990 |
| DE | 102004055396 A1 | 5/2006 |
| DE | 2010002186 A1 | 8/2011 |
| EP | 1116633 A2 | 7/2001 |
| EP | 2108550 A1 | 10/2009 |
| EP | 2653354 A1 | 10/2013 |
| GB | 2414442 A | 11/2005 |
| JP | 2000211476 A | 8/2000 |
| KR | 101266117 B1 | 5/2013 |
| WO | 9214986 A1 | 9/1992 |
| WO | 2006053600 A1 | 5/2006 |
| WO | 2007065607 A1 | 6/2007 |

OTHER PUBLICATIONS

UKIPO Search Report under Section 17(5) for Application No. GB1704557.6 dated Jul. 20, 2017 (7 pages).

Notice of Allowance dated Oct. 26, 2017 for U.S. Appl. No. 15/274,586 (35 pages).

Final Office Action dated Nov. 1, 2017 for U.S. Appl. No. 15/274,459 (37 pages).

UK Search Report dated Feb. 21, 2018 re GB Appl. No. 1715106.9.

UK Search Report dated Feb. 21, 2018 re GB Appl. No. 1715074.9.

Non-Final Office Action dated Sep. 25, 2018, U.S. Appl. No. 15/274,586, filed Sep. 23, 2016

* cited by examiner

BELT ASSEMBLY INCLUDING PAYOUT MEASUREMENT

BACKGROUND

Various systems in a vehicle may adjust performance based on a classification of an occupant based on the size, weight, etc., of the occupant. For example, operation of an airbag assembly may be adjusted, e.g., inflation time, inflation pressure, venting/tethering, etc., during a vehicle impact based on the classification of the occupant. As another example, operation of a belt assembly, e.g., pre-tensioning, locking, load limiting, etc., may be adjusted based on the classification of the occupant. There remains an opportunity to design a measurement system to collect information about the occupant.

DETAILED DESCRIPTION

Figure 1:
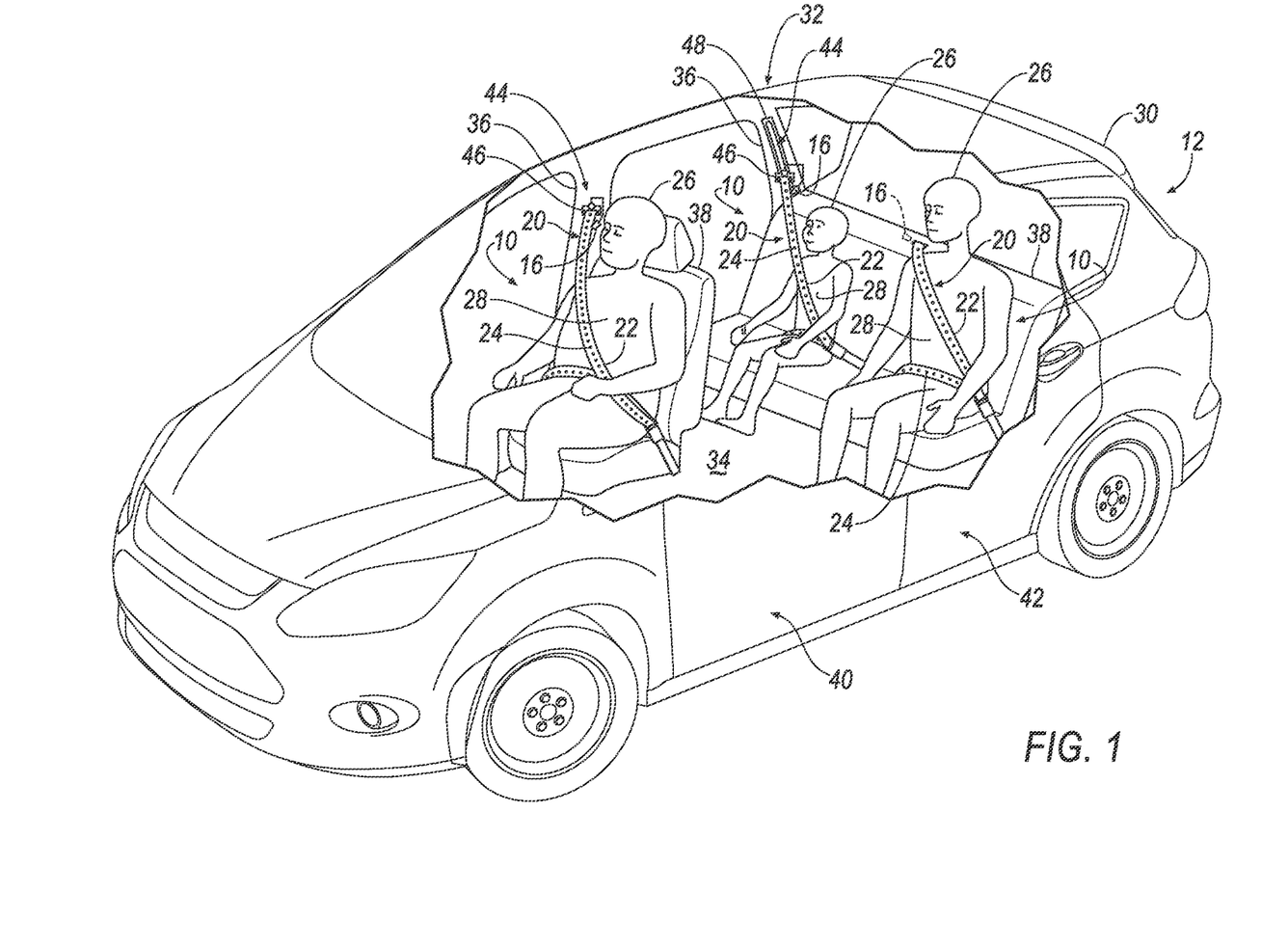
FIG. 1 is a perspective view of a vehicle including a plurality of belt assemblies.
Figure 2:
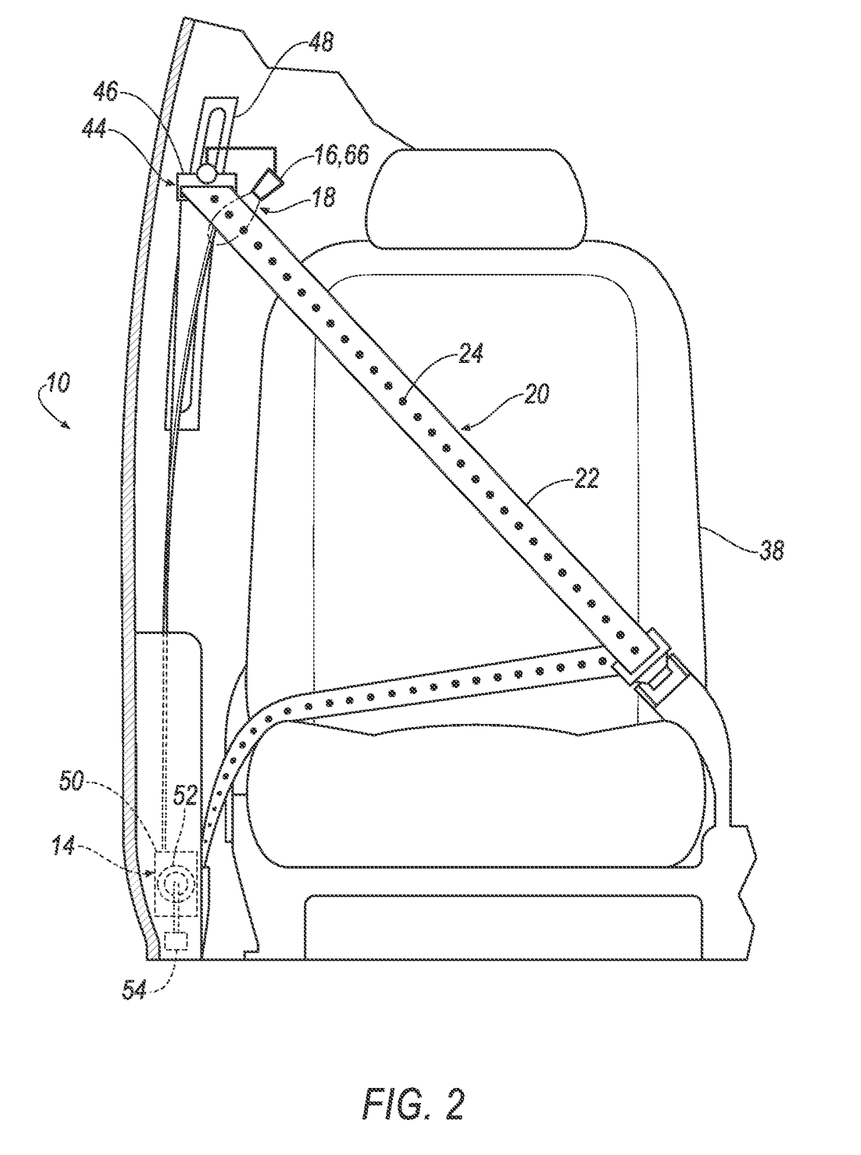
FIG. 2 is the perspective view of a portion of the vehicle including one belt assembly including a track.

With reference to the Figures, wherein like numerals indicate like parts throughout the several views, a belt assembly 10 for a vehicle 12 includes a belt retractor 14, a sensor 16 having a detection field 18, and a belt 20 retractably payable from the belt retractor 14 through the detection field 18. As shown in FIGS. 1 and 2, the belt 20 has a webbing 22 and a plurality of markers 24 fixed to the webbing 22. The webbing 22 has a longitudinal length and the markers 24 are equally spaced along the longitudinal length of the webbing 22, as shown with a distance D in FIG. 3 and FIG. 4A-B.

The sensor 16 of the belt assembly 10 determines the length of the webbing 22 paid out of the belt retractor 14. The size of an occupant 26, e.g., the torso 28 of the occupant 26, may be determined based on the length of the webbing 22 paid out by the belt retractor 14, when the belt 20 fastened. The occupant 26 of the vehicle 12 may be classified based at least on the size of the occupant 26. Various systems in a vehicle 12 may adjust performance based on the classification of the occupant 26. For example, operation of an airbag assembly (not shown) of the vehicle 12 may be adjusted, e.g., inflation time, inflation pressure, venting/tethering, etc., during a vehicle impact based on the classification of the occupant 26. As another example, operation of the belt assembly 10, e.g., pre-tensioning, locking, load limiting, etc., may be adjusted based on the classification of the occupant 26.

As shown in FIG. 1, the vehicle 12 may include a vehicle body 30 including a roof 32, a floor 34, and a plurality of pillars 36. The vehicle body 30 may have a uni-body construction, a body-on-frame construction, or any other suitable construction.

The vehicle 12 may include one or more seats 38. For example, as shown in Figures, the vehicle 12 may include a plurality of seats 38. As shown in FIG. 1, the vehicle 12 may include a plurality of belt assemblies 10 disposed adjacent the seats 38, respectively.

The seats 38 may be supported by the floor 34. Alternatively, the seats 38 may be supported by the pillars 36. The seats 38 may be arranged in any suitable arrangement. For example, as shown in the Figures, the seats 38 may be arranged in a front row 40 and a rear row 42. A seat 38 may be, for example, a bucket seat, a bench seat, a child seat, a booster seat, or any other suitable type of seat. The seats 38 may be mounted in a fixed position to the floor 34 as shown in FIG. 1. Alternatively, the seats 38 may be moveable relative to the floor 34, e.g., in a vehicle fore-and-aft direction and/or a cross-vehicle direction.

The belt assembly 10 may include an anchor point 44 spaced from the belt retractor 14 and slideably receiving the webbing 22. The anchor point 44 may position the belt 20 to restrain the torso 28 of the occupant 26 during the vehicle impact. The belt 20 may be mounted at three points, as shown in FIG. 1, or it may be mounted at two or four points. The anchor point 44 may, for example, include a D-ring 46 that slideably receives the webbing 22. The anchor point 44 may be mounted to the pillar 36, or the roof 32, e.g., for a middle seat of the vehicle 12. Alternatively the anchor point 44 may be fixed to a seatback of the seat (not shown).

As shown in FIG. 9, the anchor point 44 may be adjustably mounted to the pillar 36. Accordingly, the anchor point 44 may be adjustable to accommodate height and size differences of the occupant 26. With continued reference to FIG. 10, the belt assembly 10 may include a track 48 fixed relative to the pillar 36 and the belt retractor 14, and the anchor point 44 may be releasably lockable to the track 48 at fixed points along the track 48. Thus, the anchor point 44 may be released from a fixed point of the track 48 and locked in another fixed point of the track 48 to adjust the position of the anchor point 44 on the track 48.

Figure 6:
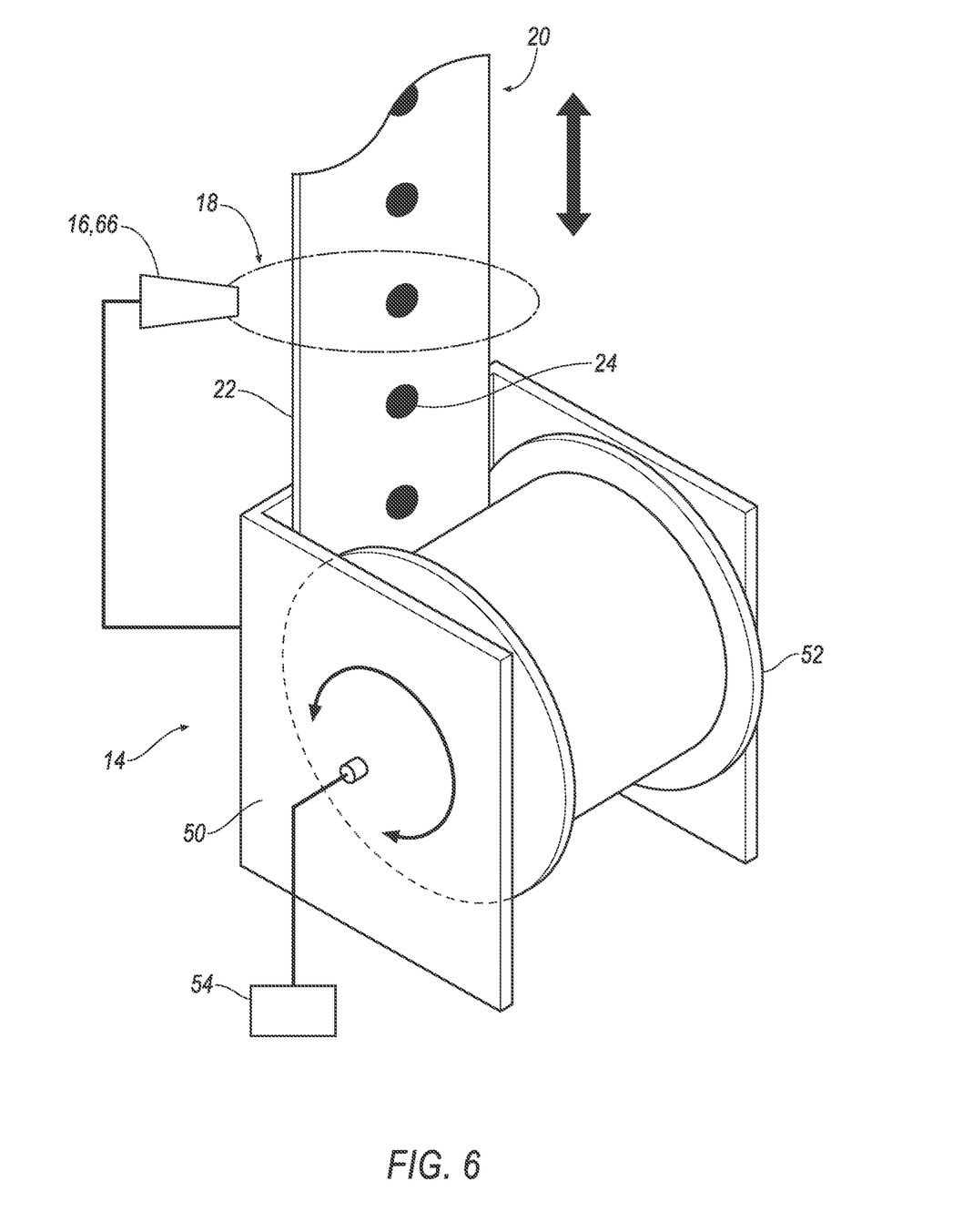
FIG. 6 is the perspective view of a belt retractor including the second sensor.

As shown in FIG. 6, the belt retractor 14 may include a housing 50 and a spool 52 receiving the belt 20 in the housing 50. The housing 50 of the belt retractor 14 may be fixed to the pillar 36, the floor 34 or any other suitable position. The belt 20 may be coiled or uncoiled around the spool 52 as the belt 20 moves into or out of the belt retractor 14 respectively.

The belt assembly 10 may include a second sensor 54 programmed to sense a direction of a movement of the belt 20 into and out of the belt retractor 14. The second sensor 54 may, for example, be fixed to the spool 52 or the housing 50. As one example, the second sensor 54 may sense rotational direction of the spool 52 relative to the housing 50. The second sensor 54 may be a mechanical, magnetic, inductive, optical, or another type of sensor.

Figure 5:
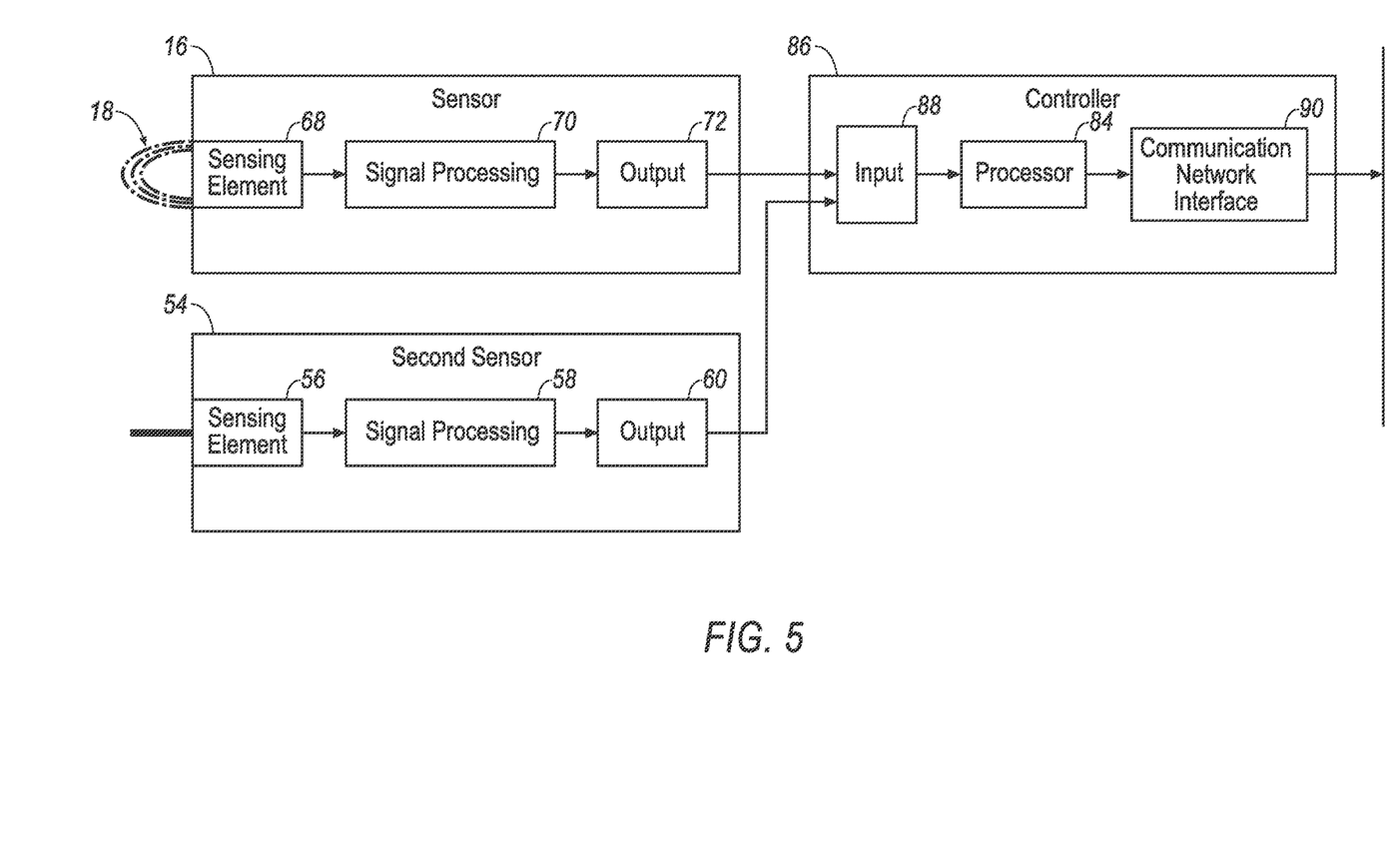
FIG. 5 is a block diagram including the sensor, a second sensor, and a controller.

As shown in FIG. 5, the second sensor 54 may include a sensing element 56, a signal processing 58, and an output 60. The signal processing 58 may be programmable to sense the direction of the movement of the belt 20. The output 60 of the second sensor 54 may report the direction of the movement of the belt 20 as an analog or a digital signal. Alternatively, the output 60 may communicate through a communication network, e.g., Control Area Network (CAN) or Local Interconnect Network (LIN) or any other communication interface.

The webbing 22 of the belt 20 may be formed of a fabric woven as a flat strip. The fabric may be formed of polyester, nylon, or any other material.

As shown in Figures, the markers 24 may be formed of a first material, as described further below, and the belt 20 may have isolating regions formed of a second material different than the first material. The markers 24 may be disposed in an alternating relationship with the isolating regions being disposed in an alternating relationship along the longitudinal length of the webbing 22. In other words, the isolating regions may be fabric material of the webbing 22 disposed between adjacent markers 24.

The markers 24 may be printed on the webbing 22. Alternatively, the markers 24 of the belt 20 may be impregnated inside the webbing 22, woven into the webbing 22, etc. Various technologies may be used to print or impregnate the markers 24. Alternatively the markers 24 may be holes 80 defined in the webbing 22.

The sensor 16 may be positioned to detect the markers 24, as the belt 20 move into or out of the belt retractor 14. The sensor 16 may be supported by the anchor point 44 (as shown in FIG. 2), the belt retractor 14 (as shown in FIG. 6), the pillar 36, or any other suitable position. In the configuration where the sensor 16 is supported by the anchor point 44, the sensor 16 may move with the anchor point 44 relative to the pillar 36. The sensor 16 may be concealed from an occupant compartment of the vehicle 12 by interior trim components (not numbered).

Figure 3:
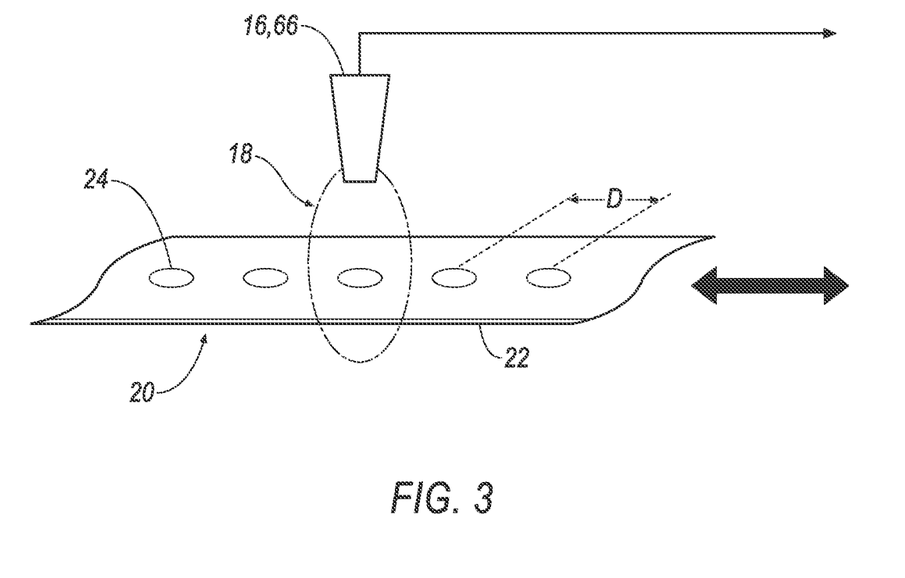
FIG. 3 is the perspective view of a belt and a sensor of the belt assembly.

With continued reference to FIG. 11, the sensor 16 may be a proximity sensor 66 also known as a contactless sensor. With reference to FIGS. 3 and 5, the sensor 16 may include a sensing element 68, a signal processing 70, and an output 72. The proximity sensor may detect the presence of the markers 24 without any physical contact. Additionally, the proximity sensor 66 may detect the size, shape, material or other characteristics of the marker 24. A range in which the proximity sensor 66 may detect the markers 24 is called the detection field 18. The detection field 18 may have a shape as shown in FIG. 12 or various other shapes.

As one example, the sensor 16 may be an inductive proximity sensor. The inductive proximity sensor may emit an electromagnetic field and may sense changes in the electromagnetic field induced by the marker 24. In this instance, for example, the markers 24 may be formed of electrically conductive material. For example, the markers 24 may be formed of copper, iron, or any other electrically conductive material.

As another example, the sensor 16 may be a capacitive proximity sensor. The capacitive proximity sensor may rely on differences in dielectric characteristics of the webbing 22 versus the markers 24.

Figure 4A:
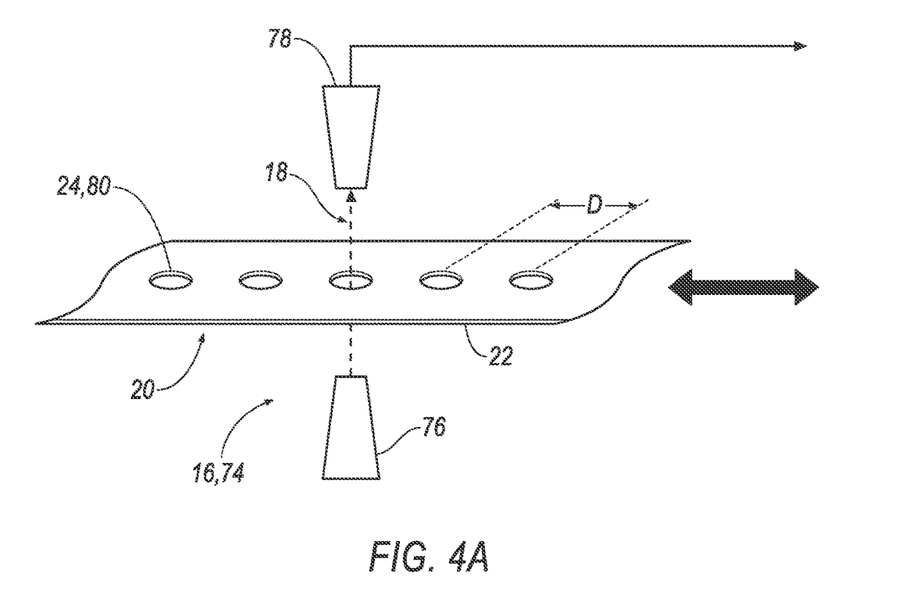
FIG. 4A is a perspective view of a portion of the belt assembly including one embodiment of a marker.
Figure 4B:
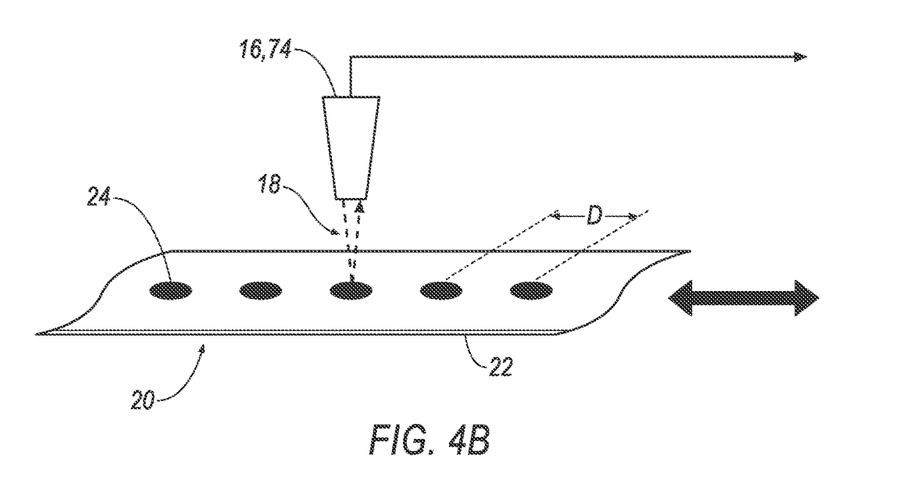
FIG. 4B is a perspective view of a portion of the belt assembly including another embodiment of the marker.

As another example, the sensor 16 may be an optoelectronic proximity sensor 74. The optoelectronic proximity sensor 74 senses the absence or presence of the markers 24 by using a light transmitter 76, e.g., laser or infrared, and a photoelectric receiver 78. As shown in FIG. 4A, the light transmitter 76 may emit light toward the photoelectric receiver 78 and the makers may be holes 80 in the webbing 22. The photoelectric receiver 78 may detect the markers 24, e.g., the holes 80, by sensing a change in the light as the markers 24 pass the photoelectric receiver 78 between the light transmitter 76 and the photoelectric receiver 78. Alternatively, as shown in FIG. 4B, the light transmitter 76 may be adjacent the photoelectric receiver 78. In this configuration, the light transmitter 76 may emit the light toward the webbing 22 and the light is reflected as a reflected beam back to the photoelectric receiver 78. The photoelectric receiver 78 may detect the markers 24 by changes in characteristics of the reflected beam, e.g., the reflective intensity or a wave length of the reflected light from the markers 24 may be different from the reflective intensity or the wave length of the light reflected from the webbing 22.

As shown in FIG. 1, when the belt 20 is fastened, a length of paid out webbing 22 may depend on the size of the occupant 26. For example, the length of the webbing 22 paid out for a larger occupant is longer than the length of the webbing 22 paid out for a smaller occupant, e.g., a child. The length of the webbing 22 paid out may be used to determine the size of the occupant 26. As stated above, the size of the occupant 26 may be used to classify the occupant 26.

The vehicle 12 may include a processor 84 programmed to determine the length of the webbing 22 paid out of the belt retractor 14 based at least on the detection of the markers 24 by the sensor 16. The processor 84 may be embedded in a microcontroller. The microcontroller may include memory, etc. The memory of the microcontroller may store instructions executable by the processor 84 and the processor 84 may read the instructions from the memory and execute the instructions. As shown in FIG. 5, the processor 84 may be integrated in a controller 86, e.g., an electronic control unit, in communication with the sensor 16 through an input 88. Alternatively, the processor 84 may be integrated in the sensor 16. The length of the webbing 22 paid out may be communicated to other controllers, e.g., an airbag controller, through a communication network interface 90 connected to the communication network, e.g., Control Area Network (CAN).

Figure 7:
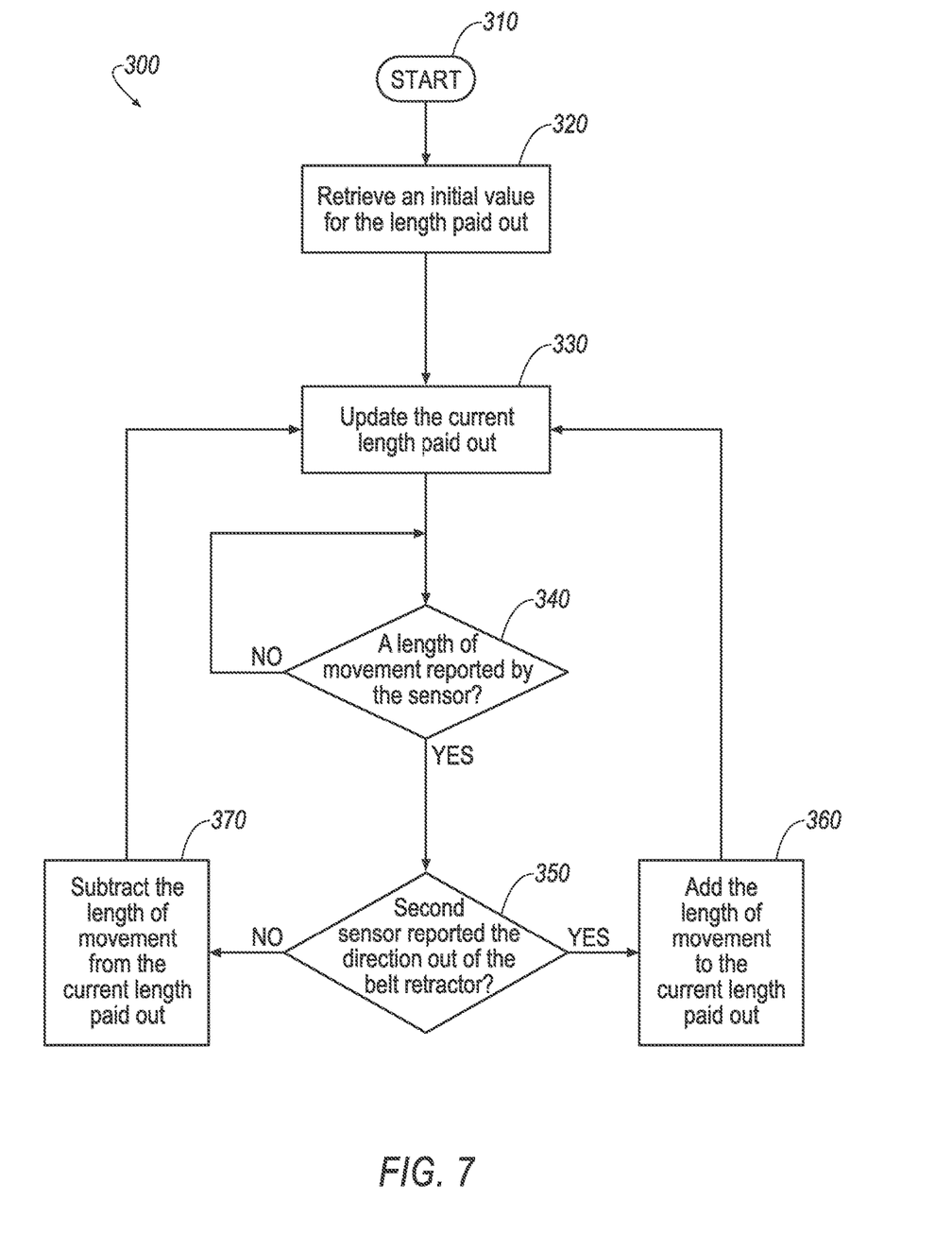
FIG. 7 is a flowchart of a process executed by the belt assembly.

FIG. 7 illustrates a flowchart of an example process 300 that may be executed by the belt assembly 10. The processor 84 may be programmed to execute the process 300. The process 300 may calculate a current length paid out, referring to the current length of the webbing 22 paid out.

With continued reference to FIG. 7, at block 310 the processor 84 may start the execution of the process 300. This may occur at any time such as when a door of the vehicle 12 is opened or the occupant 26 occupies the seat 38. This may assure a change of the length paid out is being captured even when the occupant 26 fastens the belt 20 before an engine start command is executed.

At block 320, the process may retrieve an initial value for the length paid out. This step may also include an adjustment of the initial value based on adjusting the position of the anchor point 44 on the track 48. At block 330, the current length paid out will be updated. This may occur based on the initial value retrieved at block 320 or based on the calculations steps at blocks 360 or 370.

At block 340, the process may recursively wait for reporting a length of the movement by the sensor 16. In response to reporting the length of the movement, the process may verify at block 350 the direction of the movement reported by the second sensor 54. In response to the movement out of the belt retractor 14, the process may proceed to the block 360 and add the length of movement reported by the sensor 16 to the current length paid out, i.e., an increase of the length paid out may be resulted. In response to the movement into the belt retractor 14, the process may proceed to the block 370 and subtract the length of the movement reported by the sensor 16 from the current length paid out, i.e., a decrease of the length paid out may be resulted. The current length paid out will be updated at block 330 based on an outcome of blocks 360 or 370.

Figure 8:
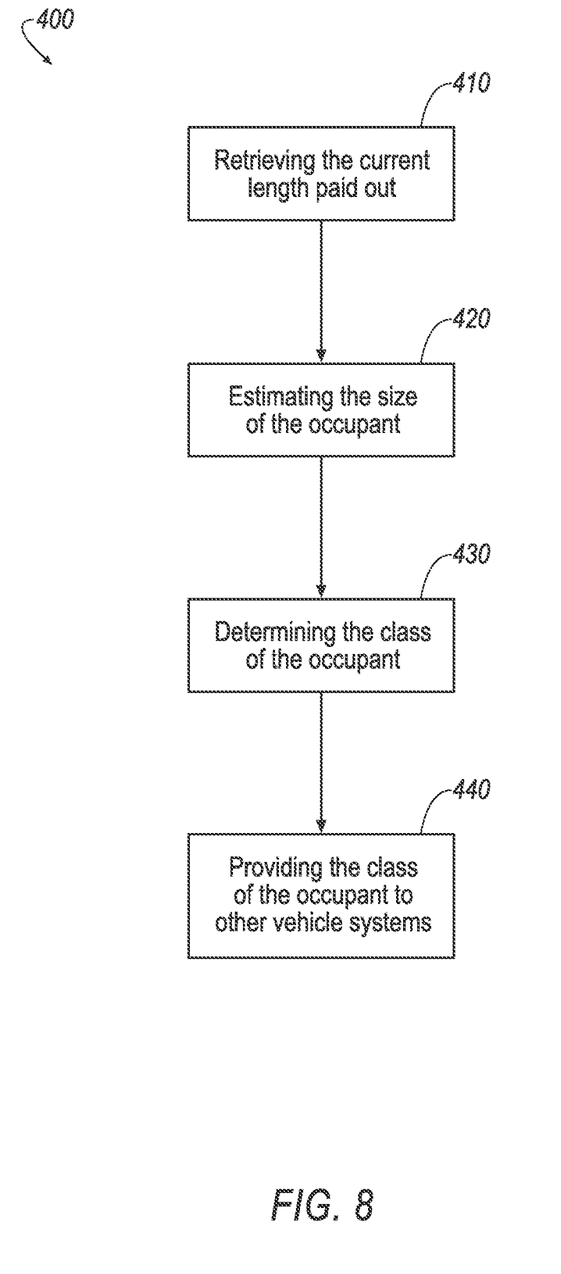
FIG. 8 is a flowchart of a classification process executed by the belt assembly.

FIG. 8 illustrates the example of a classification process 400 that may be executed by the belt assembly 10. The processor 84 may be programmed to execute the classification process 400. The classification process 400 may classify the occupant 26 of the seat 38 in various classes. This information may be used by other systems in the vehicle 12, e.g., to improve the performance of the other systems.

At block 410, the classification process may retrieve the current length paid out that may be calculated by the process 300. At block 420, the size of the occupant 26 may be estimated. This step may also take into account other information provided by any other system in the vehicle 12, e.g., the weight of the occupant 26, and a position of the seat 38. At block 430, the class of the occupant 26 may be determined. The classes may be in form of discrete values, e.g., small, medium, and large. Alternatively, it may be in form of values describing physical characteristics of the occupant 26 like height, waist measurement, etc. At block 440, the classification process may provide the class of the occupant 26 to other vehicle systems, e.g., the airbag controller.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A belt assembly comprising:
a belt retractor;
a first sensor having a detection field;
a belt retractably payable from the belt retractor through the detection field, the belt having a webbing and a plurality of markers fixed to the webbing;
the webbing having a longitudinal length, the markers being equally spaced along the longitudinal length of the webbing;
a processor programmed to determine a length of the webbing paid out of the belt retractor based at least on detection of the markers by the first sensor; and
a second sensor programmed to sense a direction of movement of the belt into and out of the belt retractor, wherein the processor is programmed to determine the length of the webbing paid out of the belt retractor based at least on the direction of movement of the belt.

2. The belt assembly according to claim 1, further comprising an anchor point spaced from the belt retractor and slideably receiving the webbing, the first sensor being adjacent the anchor point.

3. The belt assembly according to claim 2, further comprising a track fixed relative to belt retractor, the anchor point being releasably lockable to the track at fixed points along the track.

4. The belt assembly according to claim 1, wherein the first sensor is adjacent the belt retractor.

5. The belt assembly according to claim 1, wherein the first sensor is a proximity sensor.

6. The belt assembly according to claim 1, wherein the first sensor is an inductive proximity sensor.

7. The belt assembly according to claim 1, wherein the first sensor is a capacitive proximity sensor.

8. The belt assembly according to claim 1, wherein the first sensor is an optoelectronic proximity sensor.

9. The belt assembly according to claim 1, wherein the markers are formed of electrically conductive material.

10. The belt assembly according to claim 1, wherein the markers are formed of a first material, and wherein the belt has isolating regions formed of a second material different than the first material, the markers being disposed in an alternating relationship with the isolating regions along the longitudinal length of the webbing.

11. The belt assembly according to claim 1, wherein the belt retractor includes a housing and a spool receiving the belt, the second sensor being programmed to sense direction of rotation of the spool relative to the housing.

12. A belt assembly comprising:
a belt retractor;
a belt retractably payable from the belt retractor, the belt having a webbing and a plurality of markers fixed to the webbing, the webbing having a longitudinal length, the markers being equally spaced along the longitudinal length of the webbing;
an anchor point spaced from the belt retractor and slideably receiving the webbing;
a first sensor adjacent the anchor point and positioned to detect the markers, and
a second sensor programmed to sense a direction of movement of the belt into and out of the belt retractor, wherein the belt retractor includes a housing and a spool receiving the belt, the second sensor being programmed to sense direction of rotation of the spool relative to the housing.

13. The belt assembly according to claim 12, wherein the first sensor is mounted to the anchor point.

14. The belt assembly according to claim 12, further comprising a processor programmed to determine a length of the webbing paid out of the belt retractor based at least on detection of the markers by the first sensor.

15. A belt assembly comprising:
a belt retractor;
a first sensor having a detection field;
a belt retractably payable from the belt retractor through the detection field, the belt having a webbing and a plurality of markers fixed to the webbing, the webbing having a longitudinal length, the markers being equally spaced along the longitudinal length of the webbing; and
a second sensor programmed to sense a direction of movement of the belt into and out of the belt retractor, wherein the belt retractor includes a housing and a spool receiving the belt, the second sensor being programmed to sense direction of rotation of the spool relative to the housing.

* * * * *